United States Patent Office 3,523,922
Patented Aug. 11, 1970

3,523,922
PROCESS FOR THE PRODUCTION OF
POLYALDEHYDES
Iwao Yamashita, 7–253 Satsukigaoka, 3-chome, and
Noboru Yamamoto, 7–6 Midorigaoka, 1-chome, both
of Ikeda-shi, Osaka, Japan
Filed Feb. 23, 1968, Ser. No. 707,804
Claims priority, application Japan, Feb. 24, 1967,
42/11,883
Int. Cl. C08g 1/00, 1/10, 23/00
U.S. Cl. 260—67           10 Claims

ABSTRACT OF THE DISCLOSURE

A process for the production of a polyaldehyde having thioether bonds in the side chains thereof which comprises polymerizing an aldehyde alone having a thioether bond represented by the formula

wherein R' is selected from the group consisting of an alkyl radical having 1 to 6 carbon atoms and a phenyl radical, and R is selected from the group consisting of the methyl radical and a hydrogen atom, by the bulk or solution polymerization procedure in the presence of an ionic polymerization catalyst selected from the group consisting of Lewis acids and their organo complexes at a temperature from $-20°$ C. to $-150°$ C.

Among polyaldehydes having a polyether structure as the main chain thereof, polyformaldehydes have been and are being manufactured industrially and put to practical use. However, processing of polymers of aliphatic aldehydes having more than two carbon atoms is attended with various difficulties, since such polymers are poor in heat stability and, of them, those having a high degree of polymerization and particularly high crystallinity are insoluble in organic solvents.

This invention, which was developed through research in respect of the above problems, relates to a process for the production of polyaldehydes which comprises polymerizing an aldehyde alone having a thioether bond represented by the formula

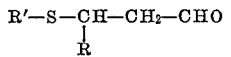

wherein R' is selected from the group consisting of an alkyl and a phenyl radical, and R is selected from the group consisting of an alkyl radical and a hydrogen atom, or copolymerizing aldehydes of said type, or copolymerizing said aldehyde and an aliphatic aldehyde to produce a polyaldehyde having thioether bonds in the side chains thereof, said polymerization or copolymerization being effected by the bulk or solution polymerization procedure in the presence of an ionic catalyst at a temperature from $-20°$ C. to $-150°$ C.

The novel polyaldehydes produced by the present invention are superior in heat stability to the known aliphatic aldehyde polymers having more than two carbon atoms, and, even when their degree of polymerization is high, all or almost all of them are soluble in organic solvents. Accordingly, the polymers can conveniently be produced in the industry and, furthermore, the difficulties in their processing are completely eliminated. In addition, the present invention is advantageous in that it is possible, by copolymerizing an aldehyde monomer having a thioether bond and an aliphatic aldehyde monomer, to produce a copolymer improved in heat stability and solubility as compared with an unstable polymer produced from an aliphatic aldehyde alone.

The object of this invention is therefore to provide a process for easily producing a polyaldehyde containing thioether bonds in the side chains thereof.

Another object of this invention is to provide a process for easily producing a polyaldehyde having superior heat stability and solubility in organic solvents.

BRIEF EXPLANATION OF THE DRAWING

FIG. 1 shows the relationship between the heating time (hour) and the rate of weight loss of the polymer produced from an aldehyde alone having thioether bonds in the side chains. FIG. 2 shows the same relationship as above of the copolymer of an aldehyde having a thioether bond in the side chain and acetaldehyde.

DETAILED EXPLANATION OF THE INVENTION

Figure 1:
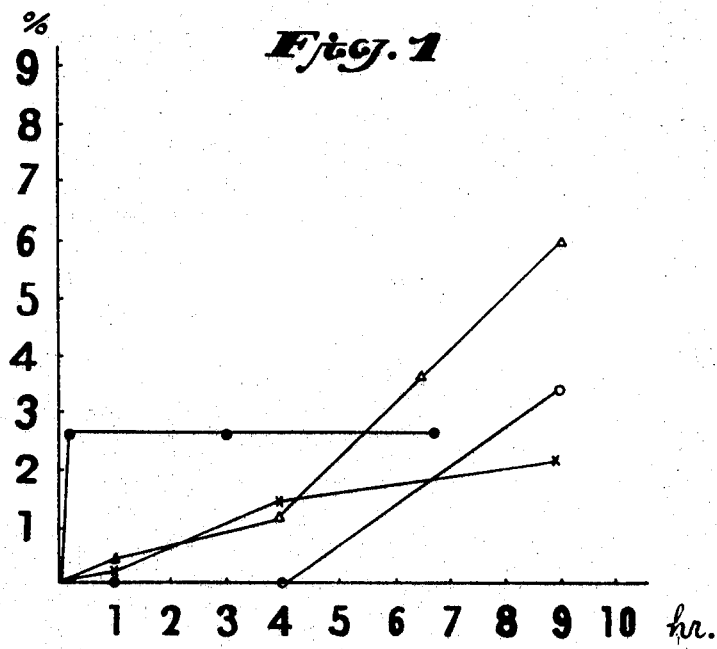
FIGS. 1 and 2 are graphs illustrating the test results of the heat stability of the polyaldehyde having thioether bonds in the side chains produced by the present invention.

The basic material used in the process of this invention is an aldehyde having a thioether bond (hereinafter referred to simply as "sulfur-containing aldehyde"), for example, β-methylmercapto-propionaldehyde,
β-ethylmercapto-propionaldehyde,
β-propylmercapto-propionaldehyde,
β-n-butylmercapto-propionaldehyde,
β-hexylmercapto-propionaldehyde,
β-phenylmercapto-propionaldehyde,
β-methylmercapto-butyraldehyde,
β-ethylmercapto-butyraldehyde,
β-propylmercapto-butyraldehyde,
β-n-butylmercapto-butyraldehyde,
β-hexylmercapto-butyraldehyde,
β-phenylmercapto-butyraldehyde, or the like.

The above sulfur-containing aldehydes can easily be prepared by the addition reaction of α,β-unsaturated aldehyde such as acrolein, crotonaldehyde, or the like, with mercaptan such as methylmercaptan, ethylmercaptan, propylmercaptan, n-butylmercaptan, hexylmercaptan, thiophenol, or the like.

The aldehyde which can be used in the copolymerization of this invention is an aliphatic aldehyde such as acetaldehyde, propionaldehyde, n-butyraldehyde, isobutyraldehyde, n-hexylaldehyde, or the like.

The catalyst used in the present invention is a well-known polymerization catalyst such as aluminum bromide, stannic chloride, a complex of boron trifluoride and ether, diethyl aluminum monochloride, ethyl aluminum dichloride, triethyl aluminum, tributyl aluminum, aluminum ethoxide, trialkyl aluminum-aniline, an alkali metal trialkyl aluminum polyphosphate, alkali metal polyphosphate-trialkyl aluminum, trialkyl aluminumethylmercaptan, or the like.

The polymerization of this invention can be carried out by mixing the above aldehyde or an organic solvent solution thereof with one or more of the aforesaid catalysts or an organic solvent solution thereof in the presence or absence of a reaction solvent in a dry nitrogen atmosphere at a temperature from $-20°$ C. to $-150°$ C. and stirring the resulting mixture or allowing it to stand.

If the reaction between the two catalyst components, or between the catalyst and the monomer, and the aging of the reaction products are necessary prior to the polymerization depending upon the type of the catalyst to be used, said reaction and aging may be carried out at a temperature suitable for said reaction and aging for a predetermined period of time, the temperature then being adjusted to one suitable for the polymerization. The polymerization time is usually from several hours to several days. The amount of the catalyst used in the polymerization varies depending upon the kinds of catalyst and aldehyde monomer used as well as upon the procedure employed for polymerization, either bulk or solution polymerization, but it is usually preferable to use 0.5 to 3 mole percent of catalyst per mole of aldehyde monomer. The solvents usable in the solution polymerization of this invention include aliphatic and aromatic hydrocarbons, diethylether, tetrahydrofuran, and the like.

The polymerization is then stopped by the addition of methanol, or ammoniacal methanol or ethanol to the reaction mixture, and the mixture is thereafter filtered, washed with water, dried and dissolved in ether or tetrahydrofuran. The resulting solution is then filtered and the filtrate is added dropwise to a non-solvent for the desired polymer to precipitate the polymer. If a solvent-insoluble polymer is partially produced, it can be separated from the solvent by filtration, decantation or centrifugation.

A copolymer having an appropriate composition ratio can be obtained when a copolymerization is carried out by charging more than two of the above sulfur-containing aldehydes combined in appropriate proportions. On the other hand, in carrying out the copolymerization of one of the above sulfur-containing aldehydes and one of the aliphatic aldehydes, the sulfur-containing aldehyde must be used in higher proportion than that contained in the desired copolymer since the copolymerizability of the sulfur-containing aldehyde is usually lower than that of the aliphatic aldehyde.

The thus-produced polymers (sulfur-containing polyacetal) were found to have polyether bonds in the main chain thereof when observed by an infrared absorption spectrum.

Figure 2:
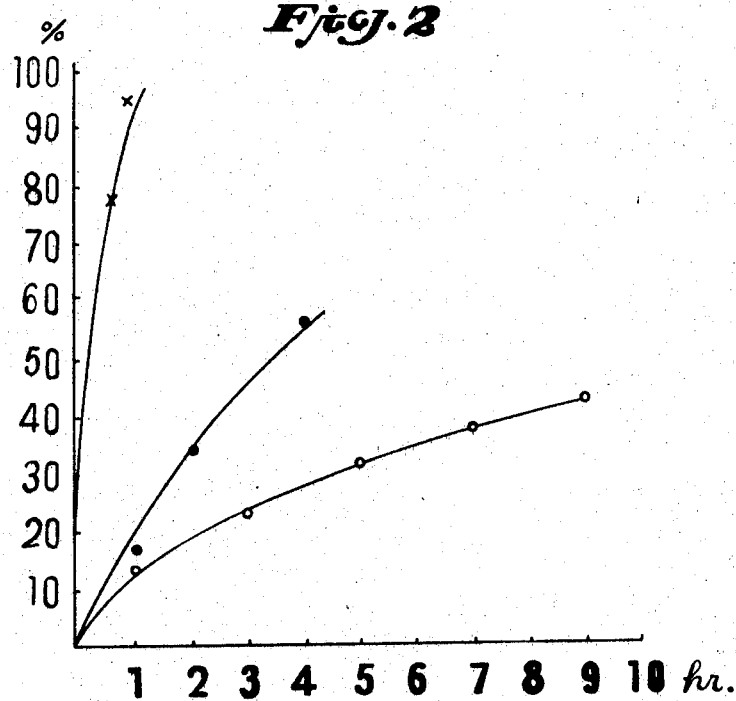

The sulfur-containing polyacetal exhibits better heat stability than that of the conventional aliphatic aldehyde polymers. Examples of the results obtained from their heat stability test are as shown in FIGS. 1 and 2. The sulfur-containing polyacetal is also characterized in that it is almost soluble in tetrahydrofuran at room temperature or in dioxane at a temperature of 80° C. Because of the above characteristics, the polyacetal of this invention may be used as raw material for the production of various industrial goods such as films, fibers, molded products, and the like.

The following examples are further illustrative of this invention, and it will be understood that the invention is not limited thereto.

EXAMPLE 1

100 g. of β-ethylmercapto-propionaldehyde was placed in a polymerization tube equipped with a gas evacuation cock and thereafter cooled to −78° C. 5 cc. of a solution of 5 g. aluminum tribromide dissolved in 10 g. of toluene was fed dropwide into the tube and the gas was evacuated from the system. The green-color of the catalyst disappeared and the mixture solidified in 5 hours. The polymerization was then stopped by adding 100 cc. of methanol to the mixture, and the polymer thus produced was dissolved in ether. The ether solution was washed with water, dried with anhydrous sodium sulfate and the ether was removed to obtain 45 g. of a polymer in the form of white powder. The polymer was then purified by being dissolved again in ether, reprecipitated by addition of ethanol, filtered and dried under reduced pressure.

EXAMPLE 2

In the same manner as in Example 1, β-propylmercaptopropionaldehyde was polymerized by using stannic chloride as a catalyst too btain 60 g. of a paste-like polymer.

EXAMPLE 3

In the same manner as in Example 1, β-n-butylmercaptobutyraldehyde was polymerized by using a complex of boron trifluoride and ether to obtain 52 g. of a paste-like polymer.

EXAMPLE 4

200 g. of β-ethylmercapto-butyraldehyde was place in a 500 cc. polymerization flask equipped with a gas evacuation cock and a vacuum stirrer, and thereafter cooled to −78° C. 8 cc. of a solution of 20% triethyl aluminum in toluene was fed dropwise into the flask while stirring. After gas evacuation, the mixture was allowed to stand at a temperature of −78° C. and solidified in 2 hours. The polymer thus produced was washed three times with a 200 cc. portion of methanol and comminuted. 6 litres of tetrahydrofuran was added thereto and the mixture was allowed to stand for a period of 7 days to completely dissolve the polymer. To the resulting solution was added 3 l. of an ethanol-water mixture (1:1 by volume) to reprecipitate the polymer, which was then filtered and dried under reduced pressure to give 120 g. of a white moxa-like (sponge-like) polymer.

EXAMPLE 5

100 g. of β-methylmercapto-butyraldehyde and 200 cc. of dried toluene were placed in a polymerization flask equipped with a gas evacuation cock and a vacuum stirrer, and thereafter cooled to −30° C. 4 cc. of a solution of 20% triethyl aluminum in toluene was fed into the flask, and the resulting mixture was allowed to stand for 30 minutes and then cooled to −78° C. After 5 hours' standing, a methanol-aqueous ammonia mixture (1:1 by volume) was added to the resulting mixture to precipitate a polymer. The thus-produced polymer was washed three times with a 50 cc. portion of ethanol and dried under reduced pressure to give 75 g. of a white resinous polymer.

EXAMPLE 6

100 g. of β-methylmercapto-propionaldehyde was placed in a polymerization tube equipped with a gas evacuation cock and thereafter cooled to −30° C. Into the tube was then fed a catalyst solution prepared by reacting 4 cc. of a solution of 20% triethyl aluminum in toluene with 0.26 g. of aniline at room temperature. The mixture was then allowed to stand for 30 minutes at the same temperature, then cooled to −78° C., and worked up in the same way as in Example 3 to give 68 g. of a white resinous polymer.

EXAMPLE 7

A heterogeneous catalyst prepared by reacting the respective predetermined amount of sodium tripolyphosphate, as shown in the table below, with 10 cc. of a solution of 20% triethyl aluminum in toluene under nitrogen stream at 0° C. was cooled to −78° C. in the same flask as in Example 4. 200 cc. of toluene and 100 g. of β-ethylmercapto-butyraldehyde were then fed into the flask, and the mixture was polymerized for a period of 24 hours. The reaction mixture was then worked up in the same way as in Example 4 to give a polymer. In this case, the yield of the polymer varied depending upon the amount of sodium tripolyphosphate used, and the results were as shown in Table 1 below. These polymers were completely soluble in tetrahydrofuran, in which case the reduced viscosity of the solution at 30° C. was in the range of 3 to 7.

TABLE 1

| Amount of Sodium tripolyphosphate (g.) | Yield of polymer (g.) | Solubility in tetrahydrofuran (percent) |
| --- | --- | --- |
| 10.8 | 48 | 100 |
| 9.6 | 52 | 100 |
| 3.5 | 44 | 100 |
| 2.6 | 22 | 100 |
| 2.1 | 18 | 100 |

EXAMPLE 8

8 cc. of a solution of 20% triethyl aluminum in toluene and 20 g. of sodium hexamethphosphate were reacted under nitrogen stream at room temperature in the same reaction vessel as in Example 4 and the gas was then evacuated from the system. 200 cc. of tetrahydrofuran was fed into the flask and the mixture was cooled to −30° C. 200 g. of β-ethylmercapto-propionaldehyde was then fed into the flask, followed by allowing the mixture to stand for 30 minutes. The resulting mixture was then cooled to −78° C., allowed to stand for 24 hours and thereafter worked up in the same way as in Example 4 to give 130 g. of a white moxa-like polymer.

EXAMPLE 9

200 g. of β-ethylmercapto-propionaldehyde was placed in the same reaction vessel as in Example 4, and 8 cc. of a solution of 20% triethyl aluminum in toluene was added thereto at the respective predetermined polymerization temperature as shown in the table below. The respective mixture was allowed to stand for 24 hours, and thereafter the reaction was stopped by adding 10 cc. of a methanol-aqueous ammonia mixture (1:1 by volume) and the polymer thus produced was separated into two fractions, one being soluble in tetrahydrofuran and the other being insoluble. Ethanol was then added to the soluble fraction to reprecipitate the polymer. The table below shows the yield of the polymer at the respective polymerization temperature.

TABLE 2

| Polymerization temperature (° C.) | Yield (g.) | Tetrahydrofuran | |
|---|---|---|---|
| | | Soluble portion (g.) | Insoluble portion (g.) |
| −78 | 120 | 75 | 45 |
| −60 | 112 | 68 | 44 |
| −40 | 106 | 52 | 54 |
| −35 | 74 | 35 | 39 |
| −30 | 20 | 20 | 0 |

EXAMPLE 10

In the same reaction vessel as in Example 4, 8 cc. of a solution of 20% triisobutyl aluminum in toluene was reacted with 0.84 cc. of ethylmercaptan under nitrogen stream at room temperature. 100 cc. of toluene was added thereto and the mixture was cooled to −30° C. 200 g. of β-methylmercapto-butyraldehyde was then added to the mixture, which was allowed to stand for one hour and thereafter cooled to −78° C. After 24 hours' standing, the mixture was worked up in the same way as in Example 5 to give 105 g. of a white resinous polymer.

To investigate the heat stability of the polymer obtained above, the polymer was heated to 100° C. in air for a predetermined time, and thereafter the gas was evacuated from the container under reduced pressure. The decomposed portion of the polymer was then removed and the remaining polymer was weighed to determine the rate of weight loss. The results obtained were as shown in FIG. 1, in which the rate of weight loss (percent) of the polymer is indicated on the ordinate and the heating time (hour) at 100° C. is indicated on the abscissa. As is clear from FIG. 1, the rate of weight loss is about 0.2% per hour. The symbols "Δ" and "·" indicate the rate of weight lots of the polymers obtained in Examples 4 and 6, respectively.

EXAMPLE 11

50 g. of β-ethylmercapto-butyraldehyde and 50 g. of β-methylmercapto-butyraldehyde were copolymerized in the same manner as in Example 10 to obtain 60 g. of a white resinous copolymer which was completely soluble in tetrahydrofuran.

EXAMPLE 12

To a solution of 100 g. of β-hexylmercapto-butyraldehyde in 200 cc. of diethyl ether placed in the same reaction vessel as in Example 4 was added 4 cc. of a solution of 20% aluminum ethoxide in toluene and thereafter the mixture was maintained at a temperature of −130° C. for 24 hours. The mixture was then worked up to give 40 g. of a white resinous substance.

EXAMPLE 13

71 g. of β-methylmercapto-propionaldehyde and 30 g. of acetaldehyde (1:1 in molar ratio) were placed in the same reaction vessel as in Example 4 and cooled to −30° C. 4 cc. of a solution of 20% triethyl aluminum in toluene was fed into the vessel, and, after 15 minutes' standing, the mixture was cooled to −78° C. and thereby solidified within one hour. The resulting solid was then worked up in the same manner as in Example 3 to obtain 70 g. of a solid white resinous polymer. The infrared absorption spectrum showed that the polymer thus obtained is a copolymer containing at least 85 molar percent of an acetaldehyde unit. The rate of weight loss at 100° C. in air of said copolymer was 17% per hours.

EXAMPLE 14

In the same manner as in Example 13, the copolymerization was carried out by using n-butyraldehyde in place of acetaldehyde to give 75 g. of a white resinous copolymer which was somewhat elastic.

EXAMPLE 15

120 g. of β-ethylmercapto-butyraldehyde and 40 g. of acetaldehyde (1:1 in molar ratio) were placed in the same reaction vessel as in Example 4 and cooled to −30° C. 9.5 cc. of a solution of 20% triethyl aluminum in toluene was fed into the vessel, and, after 10 minutes' standing, the mixture was cooled to −76° C. The reaction was then stopped by adding methanol, and tetrahydrofuran was added to the reaction mixture to separate the produced polymer into two fractions, one being soluble in tetrahydrofuran and the other being insoluble. The soluble fraction was then precipitated by adding ethanol to give 35 g. of a white resinous polymer. On the other hand, by an infrared absorption spectrum, the insoluble fraction was confirmed to be a copolymer containing about 70 molar percent of an acetaldehyde unit. The rate of weight loss by heating at 100° C. for 9 hours in air of the copolymer was 13.5% at the end of the first hour and, thereafter, was 3.1% per hour, whereas the rate of weight loss of the polymer produced from acetaldehyde alone was more than 90% at the end of the first hour as measured under the same conditions. The above rates of weight loss are shown in FIG. 2, in which the symbol "○" and "x" indicate the rates of weight loss of the above copolymer and the above aldehyde polymer, respectively. The rate of weight loss of the copolymer obtained in Example 13 is also shown with the symbol "." in FIG. 2.

What is claimed is:

1. A process for the production of a polyaldehyde having thioether bonds in the side chains thereof which comprises polymerizing an aldehyde alone having a thioether bond represented by the formula

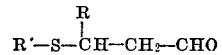

wherein R′ is selected from the group consisting of an alkyl radical having 1 to 6 carbon atoms and a phenyl radical, and R is selected from the group consisting of the methyl radical and a hydrogen atom, by the bulk or solution polymerization procedure in the presence of an ionic polymerization catalyst selected from the group consisting of Lewis acids and their organo complexes at a temperature from −20° C. to −150° C.

2. A process as defined in claim 1, wherein said aldehyde having a thioether bond is selected from the group consisting of β-methylmercapto-propionaldehyde,
β-ethylmercapto-propionaldehyde,
β-propylmercapto-propionaldehyde, β-n-butylmercapto-propionaldehyde,
β-hexylmercapto-propionaldehyde,
β-phenylmercapto-propionaldehyde,
β-methylmercapto-butyraldehyde,
β-ethylmercapto-butyraldehyde,
β-propylmercapto-butyraldehyde,
β-n-butylmercapto-butyraldehyde,
β-hexylmercapto-butyraldehyde and
β-phenylmercapto-butyraldehyde.

3. A process as defined in claim 1, wherein said ionic polymerization catalyst is selected from the group consisting of aluminum bromide, stannic chloride, a complex of boron trifluoride and ether, diethyl aluminum monochloride, ethyl aluminum dichloride, triethyl aluminum, tributyl aluminum, aluminum ethoxide, trialkyl aluminum-aniline, alkali metal polyphosphate-trialkyl aluminum, and trialkyl aluminum-ethylmercaptan.

4. A process for the production of a polyaldehyde having thioether bonds in the side chains thereof which comprises copolymerizing thioaldehydes having a thioether bond represented by the formula $$\text{R}'-\text{S}-\overset{\overset{\displaystyle R}{|}}{\text{CH}}-\text{CH}_2-\text{CHO}$$

wherein R' is selected from the group consisting of an alkyl radical having 1 to 6 carbon atoms and a phenyl radical, and R is selected from the group consisting of the methyl radical and a hydrogen atom, by the bulk or solution polymerization procedure in the presence of an ionic polymerization catalyst selected from the group consisting of Lewis acids and their organo complexes at a temperature from −20° C. and −150° C.

5. A process as defined in claim 4, wherein said aldehydes are selected from the group consisting of β-methylmercapto-propionaldehyde,
β-ethylmercapto-propionaldehyde,
β-propylmercapto-propionaldehyde,
β-n-butylmercapto-propionaldehyde,
β-hexylmercapto-propionaldehyde,
β-phenylmercapto-propionaldehyde,
β-methylmercapto-butyraldehyde,
β-ethylmercapto-butyraldehyde,
β-propylmercapto-butyraldehyde,
β-n-butylmercapto-butyraldehyde,
β-hexylmercapto-butyraldehyde and
β-phenylmercapto-butyraldehyde.

6. A process as defined in claim 4, wherein said ionic polymerization catalyst is selected from the group consisting of aluminum bromide, stannic chloride, a complex of boron trifluoride and ether, diethyl aluminum monochloride, ethyl aluminum dichloride, triethyl aluminum, tributyl aluminum, aluminum ethoxide, trialkyl aluminum-aniline, alkali metal polyphosphate-trialkyl aluminum, and trialkyl aluminum-ethylmercaptan.

7. A process for the production of a polyaldehyde having thioether bonds in the side chains thereof which comprises copolymerizing an aldehyde having a thioether bond represented by the formula $$\text{R}'-\text{S}-\overset{\overset{\displaystyle R}{|}}{\text{CH}}-\text{CH}_2-\text{CHO}$$

wherein R' is selected from the group consisting of an alkyl radical having 1 to 6 carbon atoms and a phenyl radical, and R is selected from the group consisting of the methyl radical and a hydrogen atom, with a saturated aliphatic aldehyde having 2 to 6 carbon atoms by the bulk or solution polymerization procedure in the presence of an ionic polymerization catalyst selected from the group consisting of Lewis acids and their organo complexes at a temperature from −20° C. to −150° C.

8. A process as defined in claim 7, wherein said aldehyde having a thioether bond is selected from the group consisting of β-methylmercapto-propionaldehyde,
β-ethylmercapto-propionaldehyde,
β-propylmercapto-propionaldehyde,
β-n-butylmercapto-propionaldehyde,
β-hexylmercapto-propionaldehyde,
β-phenylmercapto-propionaldehyde,
β-methylmercapto-butyraldehyde,
β-ethylmercapto-butyraldehyde,
β-propylmercapto-butyraldehyde,
β-n-butylmercapto-butyraldehyde,
β-hexylmercapto-butyraldehyde and
β-phenylmercapto-butyraldehyde.

9. A process as defined in claim 7, wherein said aliphatic aldehyde is selected from the group consisting of acetaldehyde, propionaldehyde, n-butyraldehyde, isobutyraldehyde and n-hexylaldehyde.

10. A process as defined in claim 7, wherein said ionic polymerization catalyst is selected from the group consisting of aluminum bromide, stannic chloride, a complex of boron trifluoride and ether, diethyl aluminum monochloride, ethyl aluminum dichloride, triethyl aluminum, tributyl aluminum, aluminum ethoxide, trialkyl aluminum-aniline, alkali metal polyphosphate-trialkyl aluminum, and trialkyl aluminum-ethylmercaptan.

References Cited

UNITED STATES PATENTS 3,373,167   3/1968   Dever et al. _____ 260—79 XR

FOREIGN PATENTS 628,573   10/1961   Canada.

WILLIAM H. SHORT, Primary Examiner

L. M. PHYNES, Assistant Examiner